United States Patent
Wu

(10) Patent No.: US 6,350,303 B2
(45) Date of Patent: *Feb. 26, 2002

(54) SOLID POWDER TRAPPING SYSTEM

(75) Inventor: Jack Wu, Tainan (TW)

(73) Assignee: United Microelectronics Corp., Hsinchu (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/329,114

(22) Filed: Jun. 9, 1999

(51) Int. Cl.⁷ .................... B01D 46/42; B01D 45/00
(52) U.S. Cl. ................ 96/417; 96/26; 95/3; 95/7; 95/8
(58) Field of Search .............. 96/417, 18, 22, 96/23, 24, 26, 28, 1; 73/290 R, DIG. 5, 861.11; 324/239; 116/204, 227; 340/870.31; 55/DIG. 34; 95/28, 3, 6, 7, 8

(56) References Cited

U.S. PATENT DOCUMENTS

| | | | | |
|---|---|---|---|---|
| 2,228,294 A | * | 1/1941 | Wurzbach | 324/239 |
| 3,325,009 A | * | 6/1967 | Botstiber et al. | 210/86 |
| 3,747,085 A | * | 7/1973 | Bala et al. | 324/239 |
| 4,176,545 A | * | 12/1979 | Oddo | 73/53.07 |
| 4,279,748 A | * | 7/1981 | Inoue | 210/222 |
| 4,964,301 A | * | 10/1990 | Lysen | 73/290 R |
| 5,061,364 A | * | 10/1991 | Metala et al. | 96/417 |
| 5,426,363 A | * | 6/1995 | Akagi et al. | 324/239 |
| 5,606,260 A | * | 2/1997 | Giordano et al. | 324/239 |

* cited by examiner

*Primary Examiner*—Duane Smith
*Assistant Examiner*—Jason M. Greene
(74) *Attorney, Agent, or Firm*—J. C. Patents

(57) ABSTRACT

A solid powder trapping system for filtering out solid powder from a mixture of gaseous reactants that also includes a device capable of determining the degree of powder accumulation inside the trap. The powder trapping system uses a powder trap to catch the solid powder within the gaseous mixture. A magnetic flux sensor is also installed inside the trap for measuring a magnetic flux whose strength depends on the amount of solid powder inside the trap. The magnetic flux sensor is connected to a display device so that reading from the display device reflects the amount of solid powder accumulated inside the powder trap.

6 Claims, 4 Drawing Sheets

SOLID POWDER TRAPPING SYSTEM

BACKGROUND OF THE INVENTION

1. Field of Invention

The present invention relates to a solid powder trap having a device capable of monitoring the degree of powder accumulation inside the device. More particularly, the present invention relates to a solid power trap having a device that measures the change in magnetic flux due to the accumulation of powder and hence informs the operator the degree of powder accumulation inside the trap.

2. Description of Related Art

A solid powder trap is a device frequently used to filter away suspended solid particles in a gaseous mixture. Powder traps may be employed in many engineering projects, such as inside a tunnel for trapping dust particles, for example. The air filter inside an air conditioner for filtering dust particles inside a house is also regarded as a kind of solid power trap. If the solid particles are non-toxic, the particles can simply be expelled from the generating source to the atmosphere using an exhaust fan or a pump. However, if the solid particles can lead to environmental pollution, the solid particles must first be collected and then disposed by other means. There are many methods of trapping solid particles including filtering, adsorption or electrostatic attraction. Proper method for catching the solid particles depends very much on the particle size and the particle characteristics. In general, it does not matter what method is used to catch the solid particles. Any device capable of filtering solid particles can be regarded as a solid powder trap.

In semiconductor fabrication, solid powder traps are often used alongside processing stations such as a chemical vapor deposition (CVD) station or an etcher, for example. When these processing stations are in operation, a large amount of reaction products (one example is aluminum chloride $AlCl_3$) is usually generated. Some of these reaction products may form a solid powder at atmospheric temperature. If the solid powder is not removed quickly enough, it may accumulate inside the reaction chamber of the processing station and become a source of impurities. Moreover, if the unwanted impurities are allowed to accumulate, quality of the finished product may be affected.

In general, the solid powder is removed from the reaction chamber using a powder trap. FIG. 1 is a structural diagram showing a conventional solid powder trapping system. As shown in FIG. 1, the solid powder trapping system includes an air pump 100 that connects with a reaction chamber or station (not shown in the figure). The gaseous mixture is imput out of the chamber and passed into a pipeline 102. A solid powder trap 104 is attached to the end of the pipeline 102. Therefore, as the air mixture is passed into the solid powder trap 104, solid powder suspended in the air separates out. Finally, the filtered air is expelled into a local scrubber through another pipeline 106.

For the above type of solid powder trap, there is no sensor for detecting the degree of powder accumulation inside the trap. Therefore, if one has to determine the degree of powder accumulation inside the trap, the only way is to open the trap and investigate the state of powder accumulation inside. Every other method is mostly guesswork. However, without a general knowledge of the degree of powder accumulation inside the trap, the only way to maintain operational efficiency of the trap is to clean it at a fixed time interval. Therefore, over-cleaning or under-cleaning of the trap is likely, which lead to a waste of labor and resources.

Moreover, when particle concentration inside a reaction chamber is too high or the pumping efficiency too low, it is difficult to pinpoint the problem. One must check the pump and the solid powder trap, t hereby extending the idle time o f th e machine and hence lowering its productivity.

In light of the foregoing, there is a need to provide a device for monitoring the degree o f powder accumulation inside the solid powder trap.

SUMMARY OF THE INVENTION

Accordingly, the purpose of the present invention is to provide a device for monitoring the degree of powder accumulation inside a solid powder trap. The device utilizes the dependency of magnetic flux on the amount of powder accumulated inside the powder trap for estimating the degree of powder accumulation and then using that information to schedule the appropriate cleaning or maintenance period. In particular, the cleaning operation can be scheduled during machine stop time so that machine down time is reduced and productivity is increased.

To achieve these and other advantages and in accordance with the purpose of the invention, as embodied and broadly described herein, the invention provides a solid powder trapping system having a display device showing the degree of powder accumulation. The solid powder trapping system includes a solid powder trap, a magnetic flux sensor and a display device. The solid powder trap is a column for receiving a gaseous mixture from a reaction chamber. After trapping the solid powder inside the gaseous mixture, the filtered mixture is passed out. The magnetic flux sensor is installed inside the solid powder trap for determining the state of powder accumulation by sensing the amount of magnetic flux going through a magnetic flux circuit. Any changes in magnetic flux measurement are displayed on a display device. By reading the value from the display device, the degree of powder accumulation inside the trap can be estimated.

In addition, the magnetic flux sensor includes a U-shaped iron core, a first inductive coil and a second inductive coil. The first inductive coil is wound around one arm of the iron core. An alternating current is applied to the first inductive coil. The second inductive coil is wound around the opposite arm of the iron core. The second inductive coil is connected to the display device. As current flows into the first inductive coil generates a magnetic flux in the iron core. The magnetic flux passes through the iron core in the first arm, through the accumulated solid powder and arrives at the iron core on the second arm. Hence, the second inductive coil is able to pick up the magnetic flux.

Furthermore, the external portion of the iron core is surrounded by ceramic material. The ceramic enclosure is amied to minimize the loss of magnetic flux during from along the iron core.

The display device can be a voltmeter. By tapping the magnetic flux through the second arm of the iron core, a current is generated in the second inductive coil. The current is then converted into a voltage reading that indicates the degree of powder accumulation inside the trap.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
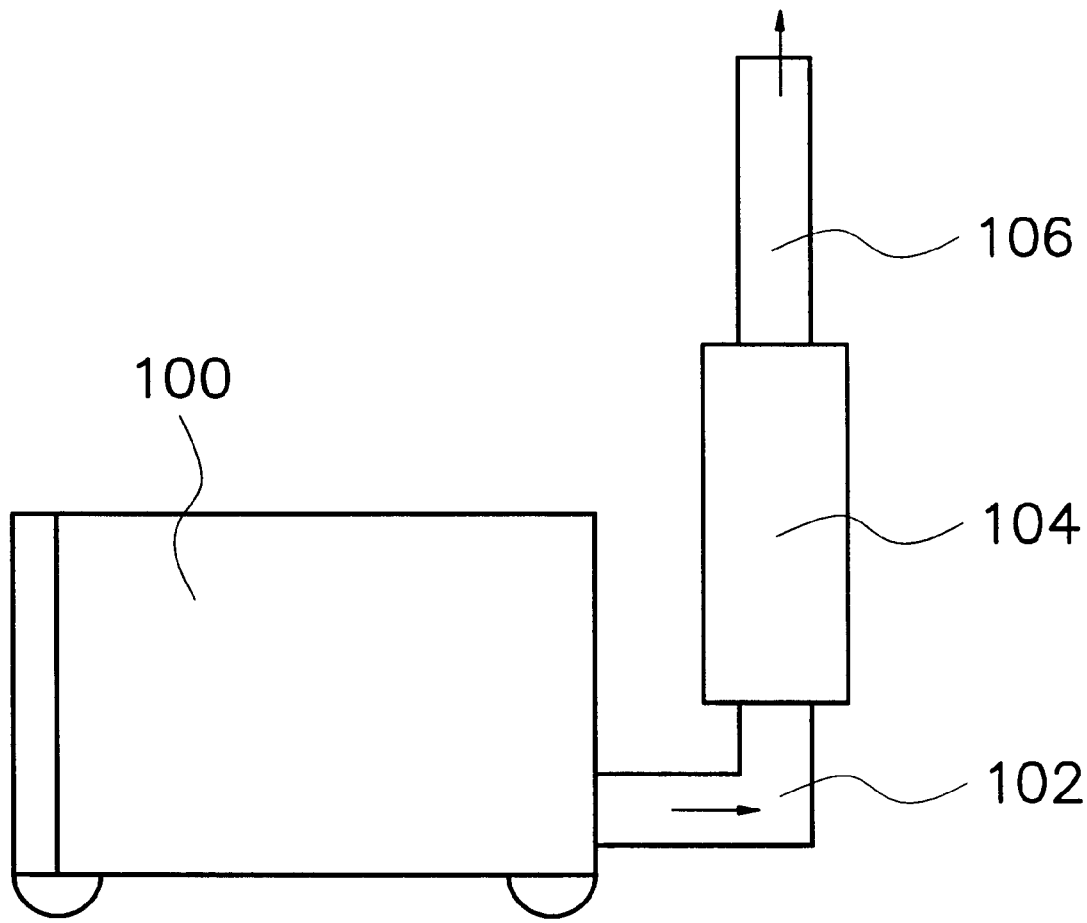
FIG. 1 is a structural diagram showing a conventional solid powder trapping system.

Reference will now be made in detail to the present preferred embodiments of the invention, examples of which are illustrated in the accompanying drawings. Wherever possible, the same reference numbers are used in the drawings and the description to refer to the same or like parts.

Since a conventional solid powder trap does not have any monitoring device of powder accumulation inside, common-sense experience or rule of thumb has to be relied on. In other words, the trap is usually dismantled for cleaning after a fixed period. In reality, the trap is affected by the pumping efficiency and the concentration of micro-particles emitted from a reaction station. Hence, the amount of powder accumulated inside the trap within a fixed period is unlikely to be the same.

In this invention, a sensing device that makes use of a magnetic flux circuit is installed inside the trap. Therefore, information regarding the state of powder accumulation inside the trap is present at any time. FIGS. 2A to 2D show the physical principles behind the utilization of a magnetic flux circuit for determining the amount of solid powder accumulation inside a solid trap according to this invention.

Figure 2A:
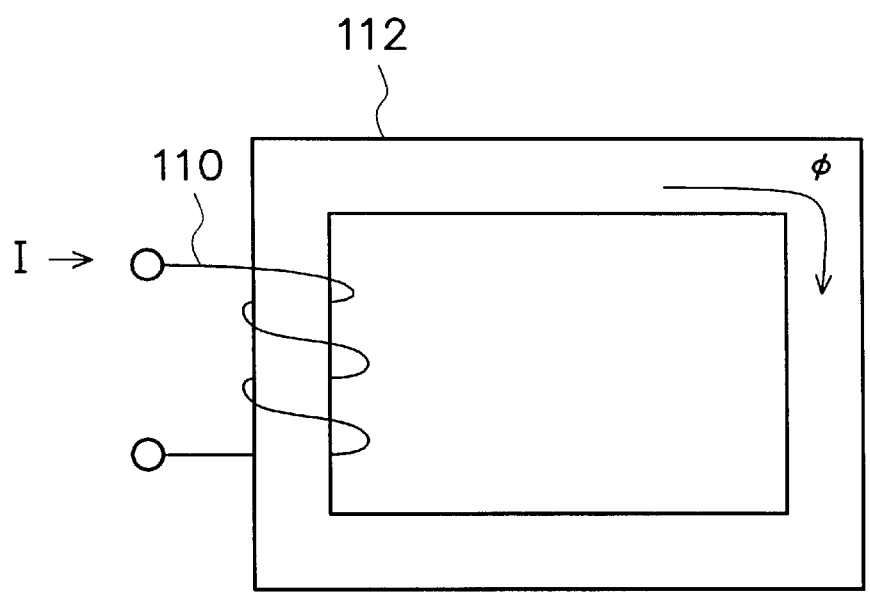
FIGS. 2A to 2D show the physical principles behind the utilization of a magnetic flux circuit for determining the amount of solid powder accumulation inside a solid powder trap according to this invention.

A magnetic device having a first inductive coil 110 and a rectangular iron core 112 is shown in FIG. 2A. The first inductive coil 110 is wound around the left arm of the rectangular iron core 112, and then a current I is passed into the first inductive coil 110. Hence, a magnetic circuit having a magnetic flux $\Phi$ is formed around the iron core 112.

Figure 2B:
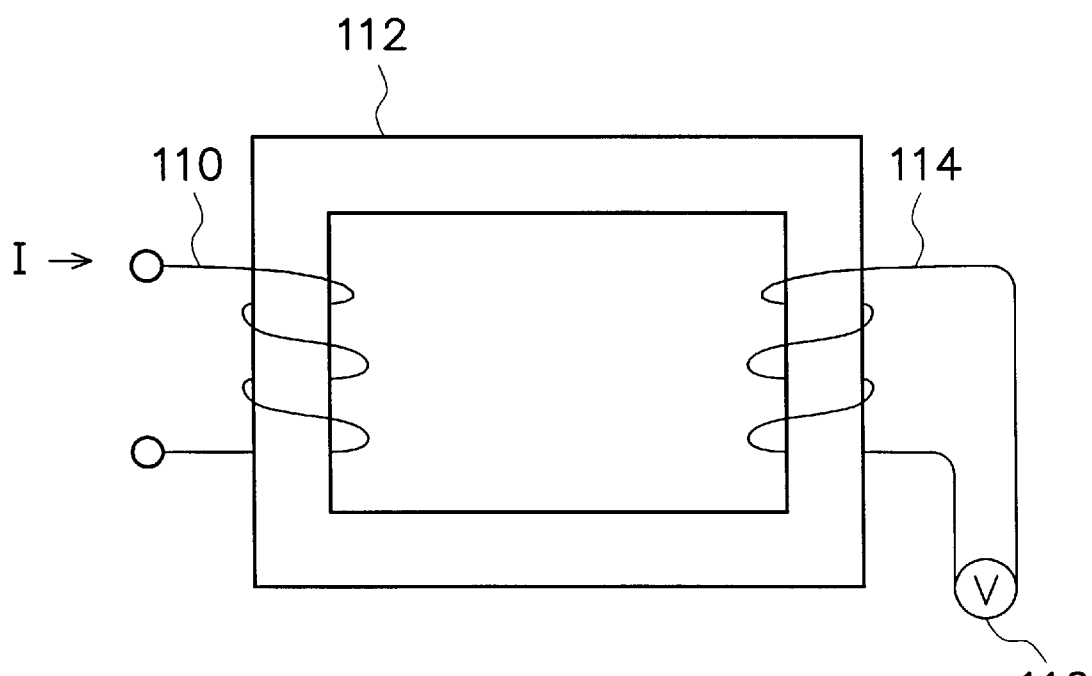

A second inductive coil 114 and a magnetic flux sensing device 116 (for example, a voltmeter) is added as shown in FIG. 2B. The second inductive coil 114 is wound around the right arm of the rectangular iron core 112 and connected to the sensing device 116. Since an alternating current is applied to the first inductive coil 110 on the left side, an alternating magnetic flux is generated around the iron core 112. Due to the alternating magnetic flux along the right arm of the iron core 112, an alternating current is produced in the second inductive coil 114, in a manner similar to a transformer. The magnitude of the magnetic flux is affected by the magnetic resistance of the iron core 112 or any medium the magnetic flux needs to cross. Therefore, the voltage at the terminals of the second inductive coil 114 as measured by the magnetic flux sensor device 116 are also affected by any changes in magnetic resistance along the magnetic circuit.

Figure 2C:
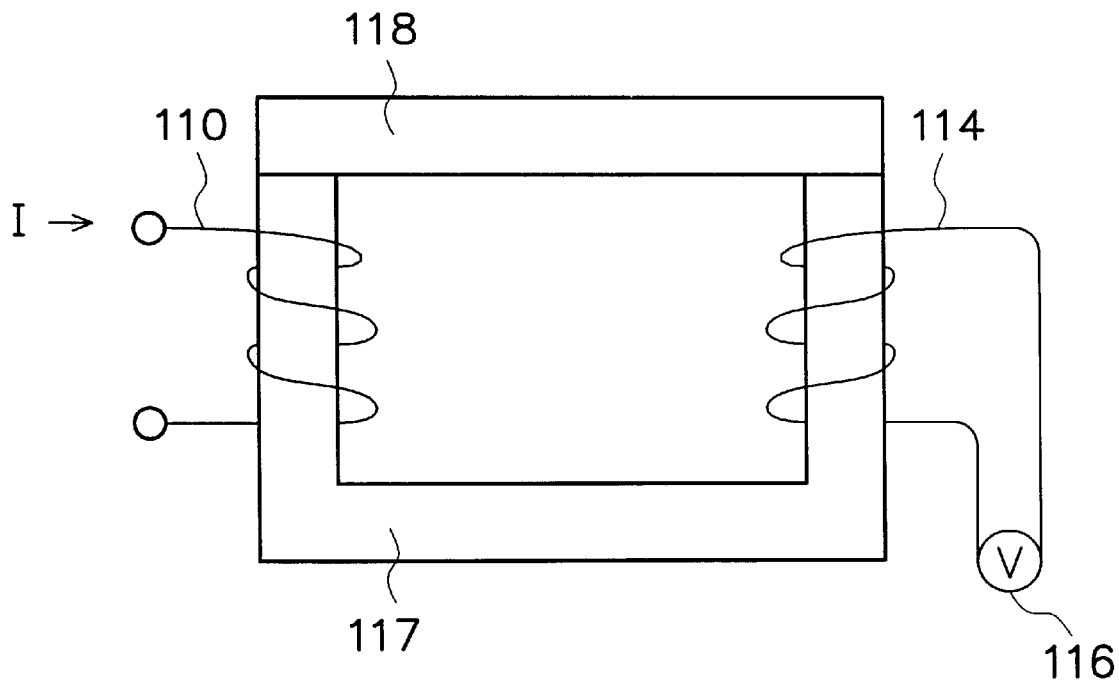

A magnetic circuit that also incorporates an air gap is shown in FIG. 2C. The rectangular iron core as shown in FIG. 2B has changed into a U-shaped core 117 (horseshoe shaped iron core). In other words, the magnetic flux needs to traverse air 118 in the upper arm of the magnetic circuit. Because air has a larger magnetic resistance, the amount of magnetic flux going to the right arm of the iron core 117 is greatly reduced. Hence, the voltage produced by the second inductive coil 114 is smaller.

Figure 2D:
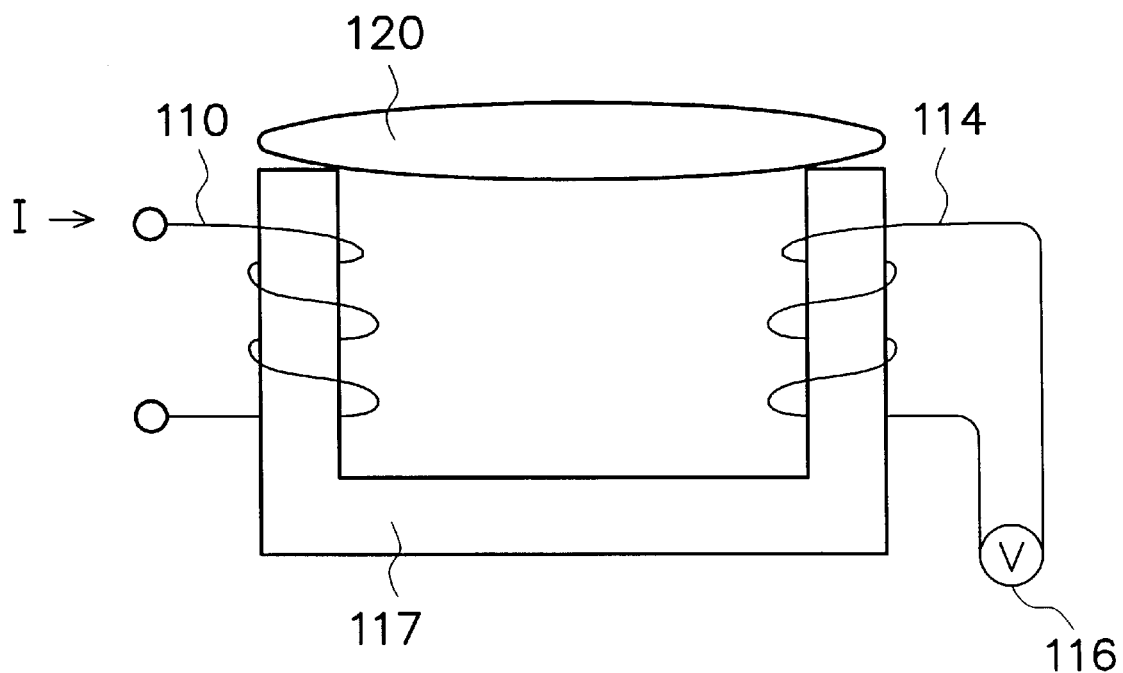

As shown in FIG. 2D, a device similar to the one in FIG. 2C is placed inside a solid powder trap. Since solid powder 120 (for example, $AlCl_3$) accumulates inside the trap during operation, the original air medium along the magnetic circuit is gradually replaced by a solid powder medium. In other words, as solid powder accumulates around the magnetic device, the cross-sectional area of the magnetic circuit increases, leading to a reduction in magnetic resistance. Because solid powder 120 has a lower magnetic resistance than air, magnetic flux passing through the second inductive coil 114 increases and hence a higher voltage is obtained. This invention utilizes the change in voltage output from the second inductive coil 114 to estimate the amount of powder accumulated inside the solid powder trap.

Figure 3:
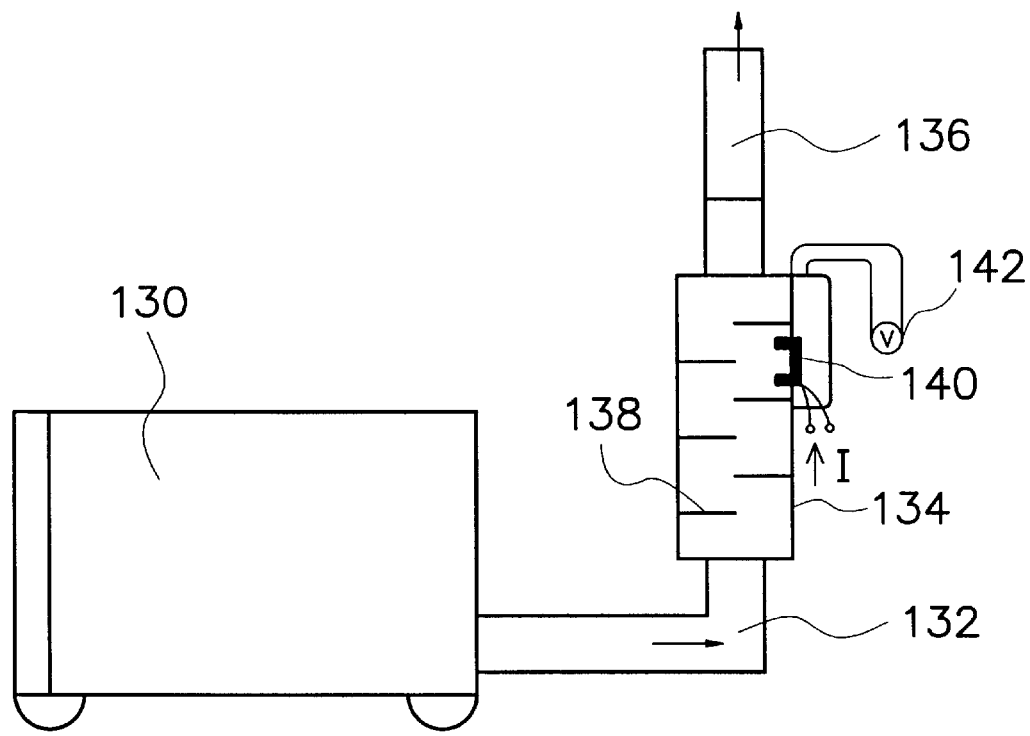
FIG. 3 is a structural diagram showing a solid powder trapping system having a device for monitoring the degree of powder accumulation according to this invention.

FIG. 3 is a structural diagram showing a solid powder trapping system having a device for monitoring the degree of powder accumulation according to this invention. The solid powder trapping system includes a filter for filtering solid powder inside a mixture of gaseous reactants and a device for monitoring the degree of powder accumulation inside the filter.

As shown in FIG. 3, a pump 130 is connected to a reaction chamber (not shown) where solid powder mixed with gaseous reactants is produced. The gaseous reactants and suspended solid powder is led through a pipeline 132 into a solid powder trap 134. The solid powder trap has a filtering structure 138 for removing the powder from the gaseous reactants. Finally, the remaining gaseous reactants are exhausted through a pipeline 136. The magnetic flux sensing device 140 is mounted somewhere inside the powder trap 134. Since the accumulation of a thicker layer of powder around the magnetic flux sensing device 140 decreases the magnetic resistance of the magnetic circuit, a higher voltage is displayed on a display device 142. Hence, the reading displayed on the display device 142 reflects the degree of powder accumulation inside the powder trap 134.

Figure 4:
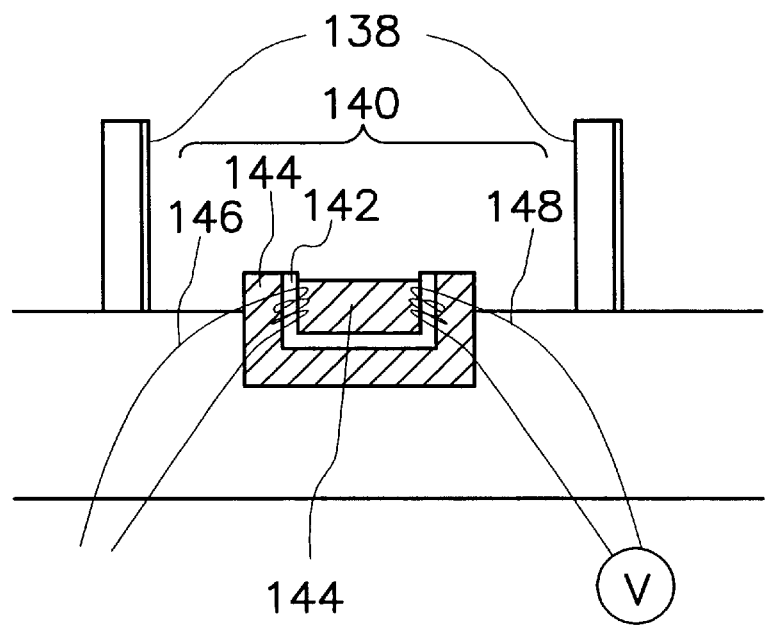
FIG. 4 is a magnified schematic view of the sensing device used for determining the degree of powder accumulation as shown in FIG. 3.

To have a better understanding of the sensing device in the powder trap, a magnified view of the sensing device for determining the degree of powder accumulation in FIG. 3 is shown in FIG. 4. As shown in FIG. 4, sections labeled 138 are part of the filtering structure inside the trap. The U-shaped iron core 142 of the magnetic flux sensing device 140 is externally enclosed by ceramic material 144. The ceramic material is aimed to prevent any possible loss of the magnetic flux generated by the first inductive coil 146 en-route to the second inductive coil 148.

The display device 140 shown in FIG. 3 can be a voltmeter, for example. By sensing the magnetic flux passing through the second inductive coil, a current flows to the display device to produce a voltage reading. By reading the display device, the state of powder accumulation inside the trap is easily determined. In addition, the voltage produced by the second inductive coil can also be converted into a digital signal, after which the digital signal can be transmitted to a central control station.

In summary, the major aspect of this invention is the utilization of the change in magnetic flux in a magnetic flux sensing device due to the accumulation of powder inside a solid powder trap. Therefore, the degree of powder accumulation inside the trap can be read off at any time, eliminating the need to carry out routine cleaning and maintenance at fixed time interval. Consequently, cleaning can be scheduled for off-hours or during a machine's idle time, and hence silicon chip production is increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A solid powder trapping system for filtering out solid powder from a mixture of gaseous reactants that includes a device which indicates the degree of powder accumulation inside the trap, comprising:
    a solid powder trap with a filtering structure that receives a mixture of gaseous reactants with suspended solid powder, filtering out solid powder and finally expelling the filtered gaseous reactants;
    a magnetic flux sensor inside the powder trap for generating a magnetic flux and measuring the change in the magnetic flux; and
    a display device connected to the magnetic flux sensor for measuring the change in magnetic flux so that the degree of powder accumulation inside the trap is displayed;
    wherein the magnetic flux sensor includes:
        a U-shaped iron core;
        a first inductive coil around one arm of the U-shaped iron core so that an input current can be applied; and
        a second inductive coil around the opposite arm of the U-shaped iron core whose terminals are connected to the display device, wherein the current flowing into the first inductive coil generates a magnetic flux that passes through the iron core and the solid powder accumulated inside the powder trap, so that the magnetic flux is sensed through the second inductive coil.

2. The solid powder trapping system of claim 1, wherein the U-shaped iron core is externally enclosed by ceramic material so as to minimize loss of magnetic flux on its way to the second inductive coil.

3. The solid powder trapping system of claim 1, wherein the display device is a voltmeter whose reading reflects the degree of powder accumulation inside the trap because the voltage picked up by the voltmeter comes from a current produced in the second inductive coil, and the magnitude of the current depends on the amount of magnetic flux that comes through the iron core and the accumulated powder inside the trap.

4. A solid powder trapping system for filtering out solid powder from a mixture of gaseous reactants that includes a device which indicates the degree of powder accumulation inside the trap, comprising:
    a solid powder trap with a filtering structure that receives a stream of mixture of gaseous reactants with suspended solid powders, filters out the solid powders and expels the filtered gaseous reactants;
    a loop magnetic flux sensor, having a portion being inserted into the solid powder trap, wherein the portion inside the solid powder trap has an open gap that uses the suspended solid powders and the gas reactants as a material with permeability, whereby a magnetic flux loop is formed on the loop magnetic flux sensor; and
    a measuring device connected to the magnetic flux sensor to measure a change in a magnetic flux on the loop magnetic flux sensor.

5. The solid powder trapping system of claim 4, wherein the loop magnetic flux sensor comprises:
    a U-shaped magnetic substance core;
    a first inductive coil around one arm of the U-shaped magnetic substance core in which is applied an input current; and
    a second inductive coil around the opposite arm of the U-shaped magnetic substance core whose terminals are connected to the measuring device, wherein the current flowing into the first inductive coil generates the magnetic flux along the magnetic loop.

6. The solid powder trapping system of claim 4, wherein the loop magnetic flux sensor comprises iron core.

* * * * *